United States Patent [19]

Ishimaru et al.

[11] Patent Number: 5,265,387
[45] Date of Patent: Nov. 30, 1993

[54] VIBRATION SUPPRESSING STRUCTURE

[75] Inventors: Shinji Ishimaru, Sohka; Takahiro Niiya, Funabashi; Kazuko Ishimaru, Sohka, all of Japan

[73] Assignees: Takenaka Corporation, Osaka; Tokyo Construction Co., Ltd., Tokyo, both of Japan

[21] Appl. No.: 882,013

[22] Filed: May 13, 1992

[30] Foreign Application Priority Data

May 30, 1991 [JP] Japan .................. 3-127806

[51] Int. Cl.$^5$ ................................ E04B 1/98
[52] U.S. Cl. ........................ 52/167 R; 52/1
[58] Field of Search ............. 52/167 R, 1, 167 DF, 52/167 CB

[56] References Cited

U.S. PATENT DOCUMENTS 4,841,685 6/1989 Masri et al. .................... 52/1

OTHER PUBLICATIONS

Vibration-Averting Structure for Adding Vertical Damping Function Using Levers, Shinji Ishimaru et al, Dec. 12-14, 1990.

*Primary Examiner*—Carl D. Friedman
*Assistant Examiner*—Creighton Smith
*Attorney, Agent, or Firm*—Oliff & Berridge

[57] ABSTRACT

A vibration suppressing structure including a main structure and a vibration suppressing section disposed in an upper portion of the main structure which is provided with an auxiliary structure adapted to undergo vibration in response to the vibration of the main structure occurring due to a disturbance, an auxiliary mass, a driving device, and a damper. The displacement of the auxiliary structure caused by the vibration is transmitted to the auxiliary mass via the driving device, and the auxiliary mass is controlled by an amount of movement directly proportional to the amount of displacement. The vibration suppressing section is arranged such that the damping coefficient of the damper, the magnitude of the auxiliary mass, and the ratio of the amount of movement of the auxiliary mass to an amount of displacement of the auxiliary structure which are included in a mass matrix $M_T$ for the vibration suppressing section, a damping matrix $C_T$, a stiffness matrix $K_T$, a location vector $i_T$ of a disturbance, are adjusted in such a manner that the relationships of $(\omega_T^j)^2 \cdot M_T i_T = K_T i_T$ and $2h_T \omega_T^j \cdot M_T i_T = C_T i_T$ hold, with respect to a natural frequency $\omega_T^j$ of a j-th mode and a predetermined damping factor $h_T$, thereby constituting a system of a pseudo singe degree of freedom. A vibration suppressing structure is obtained which is capable of effectively suppressing vibrations in a multi-storied structure and which can make effective use of the space within the structure.

4 Claims, 12 Drawing Sheets

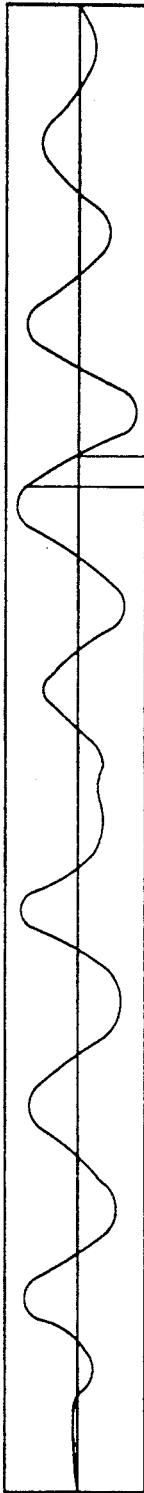
FIG.11A  m2 max. = 16.2545 [ cm ]
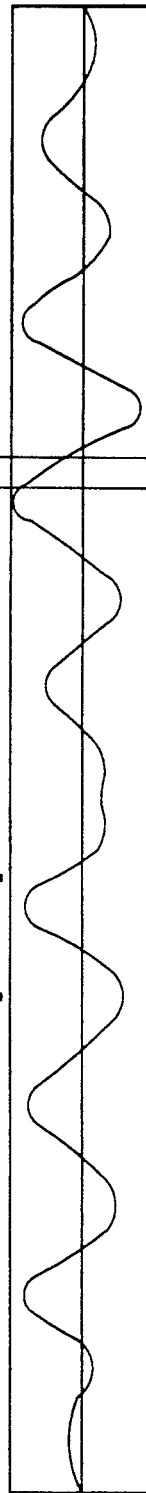
FIG.11B  md2 max. = 81.2726 [ cm ]
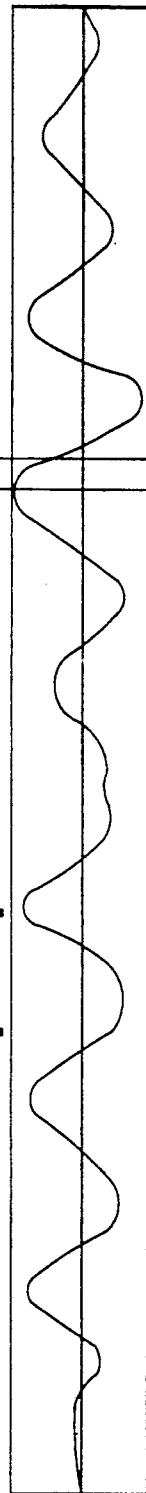
FIG.11C  m1 max. = 10.9409 [ cm ]
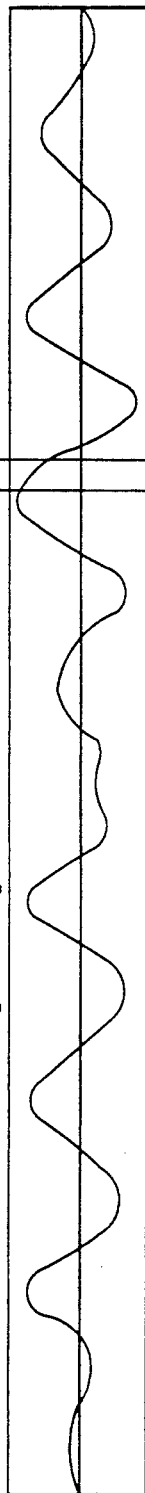
FIG.11D  md1 max. = 90.2221 [ cm ]
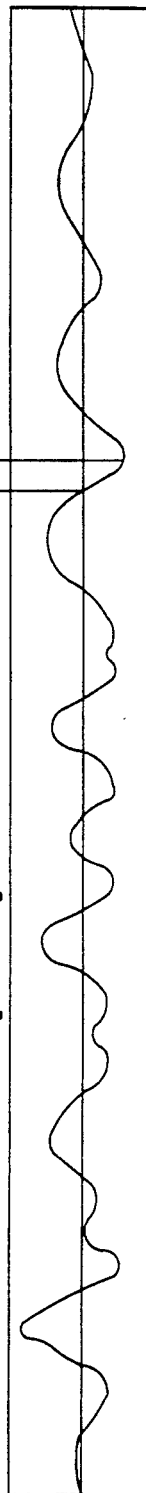
FIG.11E  m0 max. = 22.2647 [ cm ]
(INTER-STORY DISPLACEMENT)

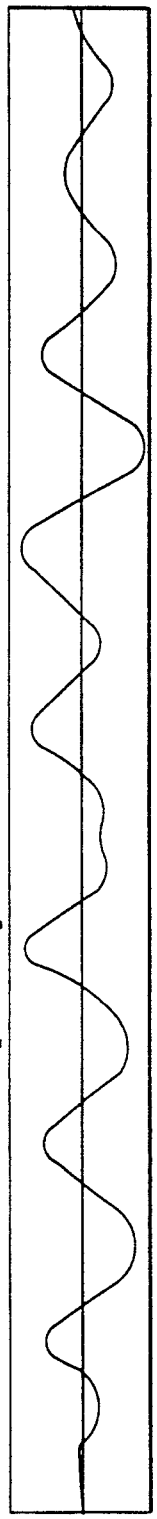# FIG.12A — m2 max. = 21.2949 [ cm ]
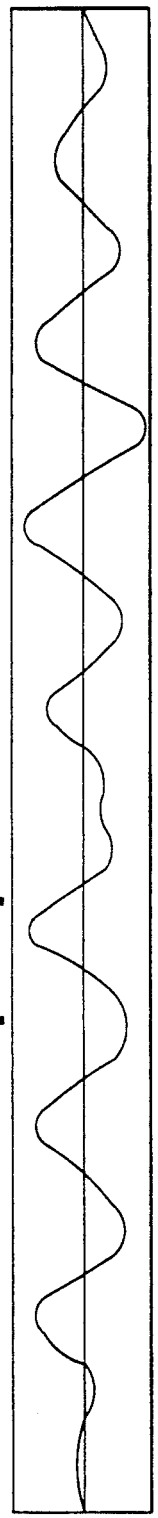# FIG.12B — md2 max. = 81.8809 [ cm ]
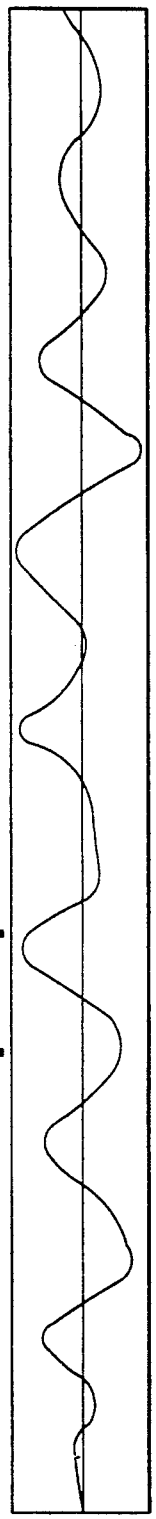# FIG.12C — m1 max. = 18.2483 [ cm ]
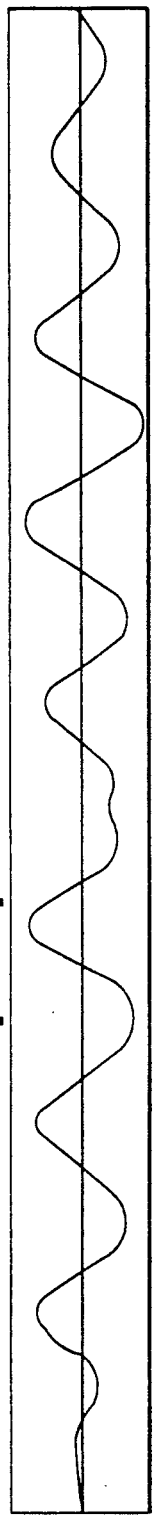# FIG.12D — md1 max. = 90.7358 [ cm ]
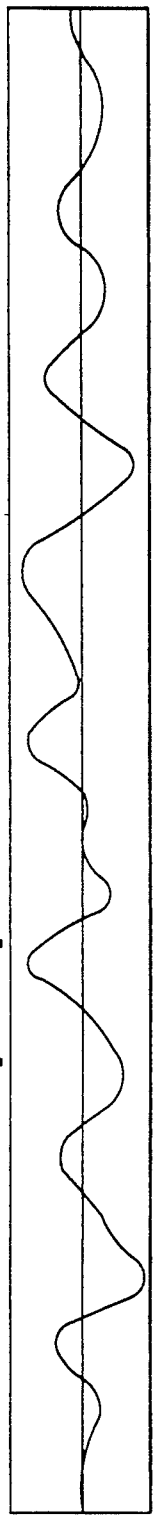# FIG.12E — m0 max. = 16.6811 [ cm ]
(ABSOLUTE DISPLACEMENT)

VIBRATION SUPPRESSING STRUCTURE

BACKGROUND OF THE INVENTION

The present invention relates to a vibration suppressing structure for suppressing the vibration of a structure caused by a disturbance such as an earthquake, a wind, or the like.

DESCRIPTION OF THE RELATED ART

As a vibration suppressing mechanism for suppressing the vibration of a structure such as a building, a differential double lever mechanism having an auxiliary mass has been proposed by the present inventors (refer to Japanese Patent Application Laid-Open No. 300540/1990). This lever-auxiliary mass mechanism is utilized for amplifying the movement of the auxiliary mass via the lever in correspondence with the relative to the movement of adjacent stories of the structure, and since the amplified inertial force of the auxiliary mass consumes earthquake-induced kinetic energy, the vibration of the structure itself can be suppressed. However, the direction of suppression of the vibration is restricted to one direction only, so that there has been a drawback in that, since the structure naturally vibrates in two horizontal directions during an earthquake or a windstorm, it is necessary to provide vibration proofing or suppressing mechanisms separately in correspondence with, for instance, the direction of an x-axis and the direction of a y-axis.

In addition, a tuned mass damper (hereafter referred to as the TMD) is known as another type of vibration suppressing mechanism. The TMD is used widely for the purpose of suppression of vibrations in the field of machinery, and a TMD which makes use of the inertia of a liquid employed as the auxiliary mass has been recently developed. However, the mass which is used in the TMD for a building is generally one-hundredth of the mass of the main structure, and since the mass ratio is so small its effect is small. Hence, it has been practically impossible to expect the mass to be capable of suppressing the behavior of the structure when a large-scale earthquake occurs. To make improvements on this technique, a method in which a base-isolated structure with laminated rubbers is utilized as the TMD is known (refer to Japanese Patent Application Laid-Open No. 273374/1987). Although the effect of suppressing the vibration of the main structure improves to the extent that the auxiliary mass itself is enlarged, this method has a large drawback in that since the base-isolated structure with laminated rubbers undergoes large movement as the TMD, the base-isolated structure itself cannot be utilized as living quarters.

To overcome this drawback, the present inventors have proposed a vibration suppressing mechanism for a multi-storied structure (refer to Japanese Patent Application Laid-Open No. 300477/1990). In this vibration suppressing structure, a subsidiary structure with auxiliary mass is provided for each story or every other story of the main structure, and each auxiliary mass is controlled via a lever in correspondence with the displacement of the auxiliary structure. At the same time, a configuration of the specific vibration mode of the structure is adjusted by the lever ratio of the lever in order to make it coincide with the participation vector which is similar or approximately similar to the location vector of the disturbance in an equation of motion. As a result, it is possible that vibration modes of the main structure other than the aforementioned specific vibration mode of the structure are not generated during earthquakes, thereby effectively suppressing the vibration of the multi-storied structure.

In the above-described vibration suppressing mechanism for the multi-storied structure, however, since the vibration suppressing mechanisms need to be provided between respective adjacent stories or in every other story of the multi-storied structure, the space occupied by the vibration suppressing mechanism in the structure becomes large. Hence, it has been impossible to make effective us of the space within the structure.

SUMMARY OF THE INVENTION

In view of the above-described circumstances, it is an object of the present invention to provide a vibration suppressing structure capable of effectively suppressing the vibration even in a multi-storied structure and of making effective use of the space within the structure.

The vibration suppressing structure in accordance with a first aspect of the invention comprises: a main structure; and a vibration suppressing section disposed in an upper portion of the main structure, wherein the vibration suppressing section is comprised of: an auxiliary structure adapted to undergo vibration in response to the vibration of the main structure occurring due to a disturbance, an auxiliary mass, driving means for controlling the auxiliary mass by an amount of movement directly proportional to an amount of displacement of the auxiliary structure caused by the vibration, in a direction in which the vibration is suppressed, and a damper, the vibration suppressing section being arranged such that a damping coefficient of the damper, a magnitude of the auxiliary mass, and a ratio of the amount of movement of the auxiliary mass to an amount of displacement of the auxiliary structure which are included in a mass matrix $M_T$ for the vibration suppressing section, a damping matrix $C_T$, a stiffness matrix $K_T$, a location vector $i_T$ of a disturbance are adjusted in such a manner that the relationships of $$(\omega_T^j)^2 \cdot M_T i_T = K_T i_T$$

$$2h_T \omega_T^j \cdot M_T i_T = C_T i_T$$

hold, with respect to a natural frequency $\omega_T^j$ of a j-th mode and a predetermined damping factor $h_T$, thereby constituting a system of a pseudo-single degree of freedom.

The vibration suppressing structure in accordance with a second aspect of the invention comprises: a main structure; a vibration suppressing section disposed in an upper portion of the main structure, wherein the vibration suppressing section is comprised of: an auxiliary structure adapted to undergo vibration in response to the vibration of the main structure occurring due to a disturbance, detecting means for detecting an amount of state variable of the auxiliary structure caused by the vibration, an auxiliary mass, an actuator for controlling the auxiliary mass by an amount of movement in which the amount of state variable of the auxiliary structure detected by the detecting means is multiplied by a predetermined proportional constant, and a damper; and setting means for adjusting the proportional constants of the vibration suppressing section which are included in a mass matrix $M_T$ for the vibration suppressing section, a damping matrix $C_T$, a stiffness matrix $K_T$, a location vector $i_T$ of a disturbance, in such a manner that the relationships of $$(\omega_T^j)^2 \cdot M_T i_T = K_T i_T$$

$$2h_T \omega_T^j \cdot M_T i_T = C_T i_T$$

hold, with respect to a natural frequency $\omega_T^j$ of a j-th order and a predetermined damping factor $h_T$.

In addition, a plurality of the vibration suppressing sections having the above-described arrangement may be superposed one on top of another in the upper portion of the main structure.

Furthermore, it is preferable to provide an additional vibration suppressing section in an intermediate story of the main structure where an element of an eigen vector in a specific higher mode becomes large.

In the first aspect of the invention, a vibration suppressing section is disposed in an upper portion of the main structure, the vibration suppressing section being comprised of an auxiliary structure adapted to undergo vibration in response to the vibration of the main structure occurring due to a disturbance, an auxiliary main structure occurring due to a disturbance, an auxiliary mass, driving means for controlling the auxiliary mass by an amount of movement directly proportional to an amount of displacement of the auxiliary structure caused by the vibration, in a direction in which the vibration is suppressed, and a damper. Thus, the vibration suppressing section is referred to as a tuned multi-mass damper (TMMD) because of utilization of plural masses as the TMD. The vibration suppressing structure including this vibration suppressing section can be arranged in the manner shown in FIG. 1, for example.

That is, two vibration suppressing sections 14, 16 are built on top of a multi-storied structure 10 to constitute a vibration suppressing mechanism 12. Each of the vibration suppressing sections 14, 16 has an auxiliary structure in which a floor 18 or 20 is supported by pillars, springs or the like whose horizontal resistance is small (whose amount of displacement with respect to a force acting in the horizontal direction is large). The floors 18, 20 are vibrated in response to the vibration of the main structure 10. It should be noted that the floors 18, 20 can be used for living quarters, as will be described later. One end of a link 22 is coupled to the floor 18 of the vibration suppressing section 14, and the other end of the link 22 is coupled to one end of a link 24. The other end of the link 24 is coupled to an auxiliary mass 26. In addition, an intermediate portion of the link 24 is pivotally supported through a link 30 by a rigid wall 28 formed integrally with the main structure 10. Accordingly, the links 22, 24, and 30 constitute a lever serving as driving means for controlling the auxiliary mass 26, and move the auxiliary mass 26 in a direction in which the displacement of the floor 18 caused by the vibration is suppressed by an amount of movement directly proportional to the amount of displacement caused by the lever. In addition, a damper 40 is interposed between the auxiliary mass 26 and the rigid wall 28. With respect to the vibration suppressing section 16 as well, an auxiliary mass 38 is coupled to the floor 20 via links 32, 34, and 36 serving as the driving means, and the auxiliary mass 38 is moved in the same way as the auxiliary mass 26. A damper 42 is similarly interposed between the auxiliary mass 38 and the rigid wall 28.

In the first aspect of the invention, the damping coefficients of the dampers 40, 42 of the vibration suppressing sections 14, 16, the magnitudes of the auxiliary masses 26, 38, and the lever ratios of the links 24, 34 which are included in the mass matrix $M_T$ for the vibration suppressing section, the damping matrix $C_T$, the stiffness matrix $K_T$, the location vector $i_T$ of a disturbance, are adjusted in such a manner that the relationships of $$(\omega_T^j)^2 \cdot M_T i_T = K_T i_T \qquad (1)$$

$$2h_T \omega_T^j \cdot M_T i_T = C_T i_T \qquad (2)$$

hold, with respect to the natural frequency $\omega_T^j$ of the j-th mode and a predetermined damping factor $h_T$.

Here, the process of driving the aforementioned Formulae (1) and (2) will d by modeling the vibration suppressing structure in FIG. 1 as shown in FIG. 2, and by defining its coordinates as shown in FIG. 3. If it is assumed as follows: the mass of the main structure 10 is $m_o$; the masses of the floors 18, 20 are $m_1$, $m_2$; the magnitudes of the auxiliary masses 26, 38 are $m_{d1}$, $m_{d2}$; the lever ratios of the links 24, 34 are $\beta_1$, $\beta_2$; a spring constant of the main structure 10 is $k_o$; spring constants between $m_2$ and $m_1$ and between $m_1$ and $m_o$ are $k_1$ and $k_2$; spring constants between the rigid wall 28 and the respective auxiliary masses 26, 38 are $k_{d1}$, $k_{d2}$; a viscous damping coefficient of the main structure 10 is $c_o$; and viscous damping coefficients between the rigid wall 28 and the respective auxiliary masses 26, 38 are $c_1$, $c_2$; and if it is assumed that, as shown in FIG. 3, in terms of the coordinates, the amounts of displacement of the main structure 10 and the floors 18, 20 are x, $d_1$, $d_2$; and an input displacement of the main structure is g, an equation of motion of the vibration suppressing section can be expressed as shown below with respect to an absolute displacement of $(x+g)$:

$$M_T d'' + C_T d' + K_T d = -M_T i_T (x'' + g'') \qquad (3)$$

where $M_T$ is a mass matrix, $C_T$ is a damping matrix, $K_T$ is a stiffness matrix, and $i_T$ is a location vector of a disturbance, and $$\left. \begin{array}{l} d^T = [d_2, d_1] \\[6pt] M_T = \begin{bmatrix} m_2 + M_{d2}\beta_2^2 & \\ & m_1 + m_{d1}\beta_1^2 \end{bmatrix} \\[6pt] C_T = \begin{bmatrix} c_2\beta_2^2 & \\ & c_1\beta_1^2 \end{bmatrix} \\[6pt] K_T = \begin{bmatrix} k_2 + k_{d2}\beta_2^2, & -k_2 \\ -k_2, & k_2 + k_1 + k_{d1}\beta_1^2 \end{bmatrix} \\[6pt] i_T = \left\{ \begin{array}{c} \dfrac{m_2 + m_{d2}\beta_2}{m_2 + m_{d2}\beta_2^2} \\[6pt] \dfrac{m_1 + m_{d1}\beta_1}{m_1 + m_{d1}\beta_1^2} \end{array} \right\} \end{array} \right\} \qquad (4)$$

Meanwhile, an equation of motion of a system in which the vibration suppressing section and the main structure are integrated can be expressed as follows:

$$Mx'' + Cx' + Kx = -Mig'' \qquad (5)$$

Here, $$x^T = [d^T, x] = [d_2, d_1, x]$$
$$i^T = [0, 0, 1]$$
$$M = \begin{bmatrix} M_T, & M_T i_T \\ i_T^T M_T, & m_x \end{bmatrix}$$
$$C = \begin{bmatrix} C_T & \\ & c_0 \end{bmatrix}$$
$$K = \begin{bmatrix} K_T & \\ & k_0 \end{bmatrix}$$

(6)

where $m_x = m_o + m_2 + m_1 + m_{d2} + m_{d1}$

In a case where the vibration suppressing mechanism in accordance with the present invention is not provided, $m_{d1}$, $m_{d2}$, $\beta_1$, $\beta_2$, $k_{d1}$, $k_{d2}$ are respective zeros, and the equation agrees with an equation of motion of an ordinary structure.

Here, in order to suppress the vibration of the main structure 10 in a case where the main structure 10 is multi-storied, in this aspect of the invention, the eigen vector $r_T^j$ of the j-th mode in the vibration suppressing section is made to agree with the location vector $i_T$ as shown in Formula (7).

$$r_T^j = i_T \tag{7}$$

Now, if it is assumed that the modal displacement of the j-th mode is $g^j$, its natural frequency is $\omega_T^j$, and a damping factor is $h_T$, the following Formula (8) holds:

$$(g^j)'' + 2h_T \omega_T^j (q^j)' + (\omega_T^j)^2 q^j = -(x'' + g'') \tag{8}$$

In general, in accordance with modal analysis, the response deformation can be expressed as the following Formula (9):

$$d = \sum_m \eta^m r_T^m q^m \tag{9}$$

where $\eta^m$ is the participation factor of the m-th mode and can be expressed as the following Formula (10):

$$\eta^m = \frac{(r_T^m)^T M_T i_T}{(r_T^m)^T M_T r_T^m} \tag{10}$$

In this aspect of the invention, however, since the values of the respective elements in each matrix are adjusted in such a manner that Formula (7) holds, the following Formula holds:

$$\eta^m = 0 \quad \text{(where } m \neq j\text{)} \tag{11}$$
$$\eta^j = 1$$

This is because the following principle of orthogonality exists:

$$(r_T^m)^T M_T r_T^j = ) \text{ (where } m \neq j) \tag{12}$$

Accordingly, vibration modes other than that of the j-th order are not excited in the vibration suppressing section, so that Formula (9) can be rewritten as Formula (13).

$$d = r_T^j q^j = i_T q^j \tag{13}$$

On an assumption that Formula (13) holds, a conditional expression to make Formula (7) hold is determined as shown below. If each term of Formula (3) is multiplied by $M_T^{-1}$ and Formula (13) is substituted therefor, the following formula is obtained:

$$i_T(q^j)'' + M_T^{-1} C_T i_T (q^j)' + M_T^{-1} K_T i_T q^j = -i_T(x'' + g'') \tag{14}$$

Meanwhile, assuming the system having the natural frequency $\omega_T^j$ and the viscous damping factor $h_T$ is vibrating in the state holding the participation vector of $i_T$, the behavior of the system can be expressed by multiplying Formula (8) by $i_T$.

$$i_T(q^j)'' + 2h_T \omega_T^j i_T(q^j)' + (\omega_T^j)^2 i_T q^j = -i_T(x'' + g'') \tag{15}$$

Equating Formula (14) to Formula (15), the aforementioned Formulae (1) and (2) can be obtained. Here, after the values of the mass matrix $M_T$, the stiffness matrix $K_T$, and the location vector $i_T$ of a disturbance are adjusted in such a manner that Formula (1) holds, the value of the damping matrix $C_T$ is adjusted in such a manner that Formula (2) holds when the predetermined damping factor $h_T$ is given with respect to that of the j-th mode. It should be noted that, as is apparent from Formulae (4), the mass matrix $M_T$, the damping matrix $C_T$, the stiffness matrix $K_T$, and the location vector $i_T$ of the disturbance are the functions of $m_{d1}$, $m_{d2}$, $\beta_1$, $\beta_2$, respectively. Hence, by adjusting the magnitude of the auxiliary mass and the lever ratio, the values of the mass matrix $M_T$, the damping matrix $C_T$, the stiffness matrix $K_T$, and the location vector $i_T$ of the disturbance can be adjusted. As a result, the vibration modes of the vibration suppressing mechanism 12 other than the j-th vibration mode are suppressed, so that the vibration suppressing mechanism can be handled as a system of single degree of freedom which vibrates only in the j-th vibration mode $i_T$.

Accordingly, x in the first expression in Formulae (6) can be rewritten as shown in the following Formula (16):

$$X = \begin{Bmatrix} i_T q^j \\ x \end{Bmatrix} = \begin{bmatrix} i_T, & 0 \\ 0, & 1 \end{bmatrix} \begin{Bmatrix} q^j \\ x \end{Bmatrix} \tag{16}$$

Here, since the behavior of the vibration suppressing section can be expressed by $i_T$ and $q^j$, the movement of the vibration suppressing structure including the vibration suppressing section is set as $X_c$ and is defined as follows:

$$X_c^T[q^j, x] \tag{17}$$

Formulae (16) and (17) are substituted for Formula (5), and if the equation of motion of the integrated response-controlled structure is rewritten in such a manner that the matrices become symmetrical, we have $$M_c X_c'' + C_c X_c' + K_c X_c = -M_c i_c g''$$

Here,

-continued $$M_c = \begin{bmatrix} i_T^T M_T i_T & i_T^T M_T i_T \\ i_T^T M_T i_T & m_x \end{bmatrix}$$

$$C_c = \begin{bmatrix} i_T^T C_T i_T & \\ & c_0 \end{bmatrix}$$

$$K_c = \begin{bmatrix} i_T^T K_T i_T & \\ & k_0 \end{bmatrix}$$

$$i_c^T = [0, 1]$$

(18)

where $m_x = m_0 + m_2 + m_1 + m_{d2} + m_{d1}$.

Since, $i_T^T M_T i_T$ and $i_T^T C_T i_T$ are scalar amounts, i.e., individual numerical values, so that the aforementioned formula is the same as the equation of motion of an ordinary mass-spring system having two degrees of freedom. Consequently, the suppression of the main structure can be attained by using the tuned mass damper (TMD) theory with respect to the frequency and damping of the vibration suppressing section. However, unlike an ordinary TMD, the floors of a plurality of stories are included in the mass of the vibration suppressing section in accordance with the present invention, so that a TMD mechanism having a very large auxiliary mass ratio is structured. Since aforementioned composition, this vibration suppressing section is called a tuned multi-mass damper (TMMD). It is needless to say that the effective mass at that time is $i_T^T M_T i_T$ as shown in Formula (18).

Furthermore, the mass of a conventional TMD is subjected to large movement, so that it has been impossible for the floor concerned to be used for the living quarters. In the present invention, however, since the magnitude of the swaying of the living quarters can be adjusted by the location vector $i_T$ of a disturbance in the vibration suppressing section, as shown in Formula (16), it is possible to determine a targeted design satisfactorily through a tradeoff between $i_T$ and $i_T^T M_T i_T$. Accordingly, the vibration of not only the main structure but also the auxiliary structure in the vibration suppressing section can be suppressed. As a result, the floor which is used for the living quarters can be utilized as the auxiliary structure. Thus, since the vibration suppressing mechanism is arranged by providing lever mechanisms, serving as the driving means, to a plurality of stories in an upper portion of the structure, it becomes unnecessary to allocate a large space within the structure for the purpose of vibration suppression.

In addition, in the first aspect of the present invention, since the suppression of the vibration of the main structure 10 can be effected by the vibration suppressing mechanism 12 provided in the upper portion of the main structure 10, it is possible to make effective use of the space within the main structure 10.

It should be noted that although in the above-described arrangement the vibration suppressing sections 14, 16 are built on top of one another in the upper portion of the main structure 10 to constitute the vibration suppressing mechanism 12, the present invention is not restricted to the same, and a single vibration suppressing section may be installed in the upper portion of the main structure so as to constitute the vibration suppressing mechanism capable of displaying the above-described vibration suppressing effect. In this case, the number of the elements in each of the mass matrix $M_T$, the damping matrix $C_T$, and the stiffness matrix $K_T$ in Formula (4) above becomes 1, respectively. In addition, since the location vector $i_T$ of a disturbance becomes a scalar amount, Formulae (1) and (2) can be rewritten as follows:

$$(\omega_T^j)^2 \cdot M_T = K_T \quad (19)$$

$$2h_T \omega_T^j \cdot M_T = C_T \quad (20)$$

As the damping coefficient of the damper, the magnitude of the auxiliary mass, and the ratio of the amount of movement of the auxiliary mass to the amount of displacement of the auxiliary structure are adjusted in such a manner as to satisfy the above Formulae, the vibration of the main structure and the auxiliary structure can be suppressed.

In the second aspect of the invention, the amount of state variable of the auxiliary structure caused by the vibration is detected by the detecting means, and the auxiliary structure is controlled by an amount of movement in which the amount of state variable detected is multiplied by a predetermined proportional constant. As a result, the magnitude of each element in the matrices of the equation of motion in Formula (3) above can be adjusted by the proportional constant or the magnitude of the auxiliary mass. Accordingly, the aforementioned proportional constant of the vibration suppressing section can be set in the mass matrix $M_T$, the damping matrix $C_T$, the stiffness matrix $K_T$, the location vector $i_T$ of a disturbance, in such a manner that Formulae (1) and (2) above hold, with respect to the natural frequency $\omega_T^j$ of the j-th mode and a predetermined damping factor $h_T$. As a result, in the same way as the first aspect of the invention, the vibration suppressing section can be handled as a system of single degree of freedom which vibrates only in the j-th vibration mode $i_T$. Hence, the vibration suppressing section can function as a TMMD as an appropriate damping factor $h_T$ is imparted thereto, so that the vibration of a super high-rise main structure or the like can be effectively suppressed. In addition, since the vibration of the main structure can be suppressed by the vibration suppressing mechanism installed in the upper portion of the main structure, it becomes unnecessary to allocate a large space within the main structure for the purpose of vibration suppression. In addition, the vibration suppressing structure in accordance with the second aspect of the invention can be applied even in a case where the stiffness of the rigid wall 28 is low or where the rigid wall 28 is not present in the vibration suppressing structure shown in FIG. 1, for instance.

It should be noted that it is preferable to provide an additional vibration suppressing mechanism in an intermediate story where the magnitude of the vibration is large in the vibration of a higher vibration mode occurring in the main structure, i.e., in an intermediate story where a maximal value of magnitude occurs. For instance, in the first or second aspect of the invention, in a case where the effect of the higher vibration mode of the main structure is large, the vibration of the main structure can be effectively suppressed by providing the vibration suppressing mechanism in the intermediate story where a maximal value of the magnitude in that vibration mode occurs.

The other objects, features and advantages of the present invention will become more apparent from the following detailed description of the invention when read in conjunction with the accompanying drawings.

BRIEF DESCRIPTION OF THE DRAWINGS

FIG. is a schematic diagram of a vibration suppressing structure in accordance with the present invention;

FIGS. 11A to 11E are diagrams illustrating response time histories of inter-story displacement when N-S components obtained at Hachinohe in the Tokachi-offing earthquake in 1968 are set as the earthquake input g; and FIGS. 12A to 12E are diagrams illustrating response time histories of absolute displacement when the N-S components obtained at Hachinohe in the Tokachi-offing earthquake in 1968 are set as the earthquake input g.

DESCRIPTION OF THE PREFERRED EMBODIMENT

A detailed description of the embodiments of the present invention will be given hereafter. It should be noted that numerical values given in the embodiments are illustrative only and the present invention is not to be restricted to the same.

First Embodiment

Figure 4:
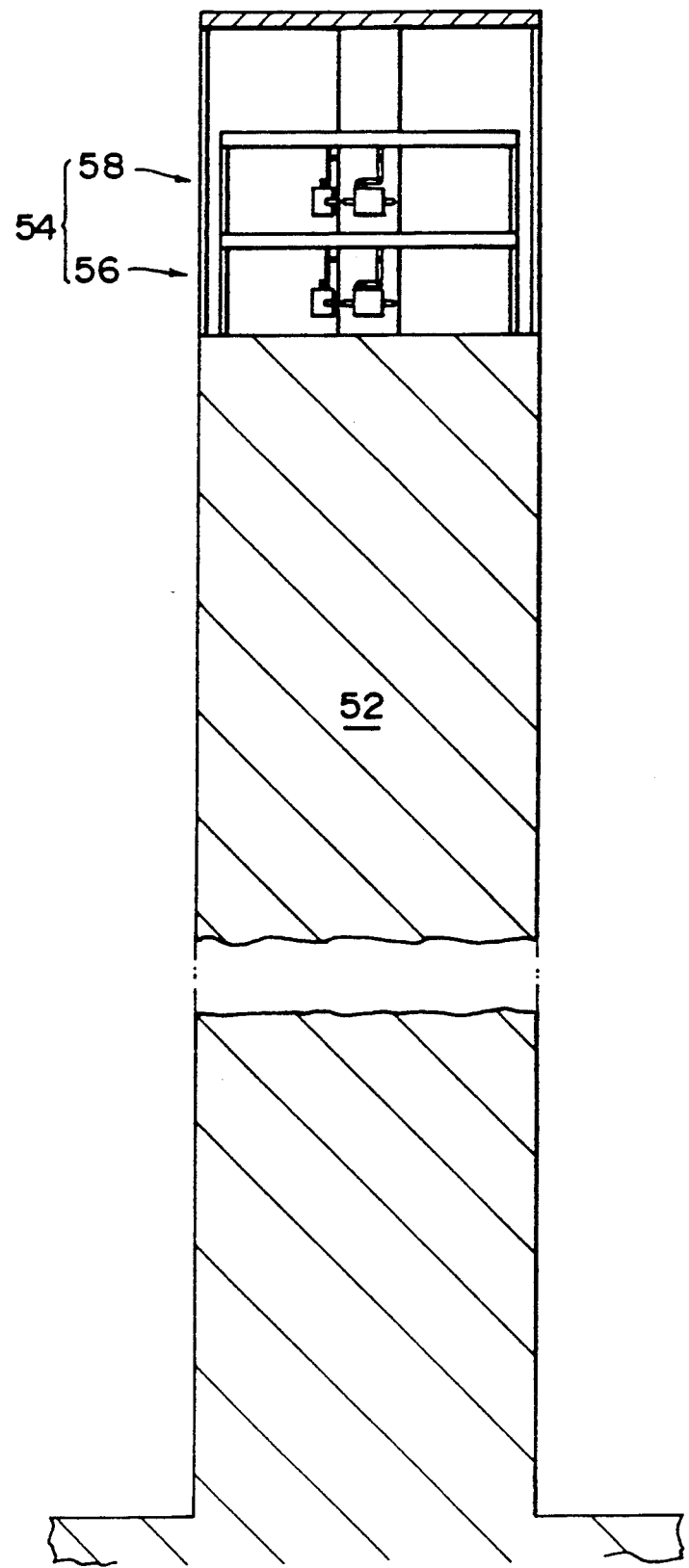
FIG. 4 is a side elevational view illustrating a vibration suppressing structure in accordance with a first embodiment.
Figure 5:
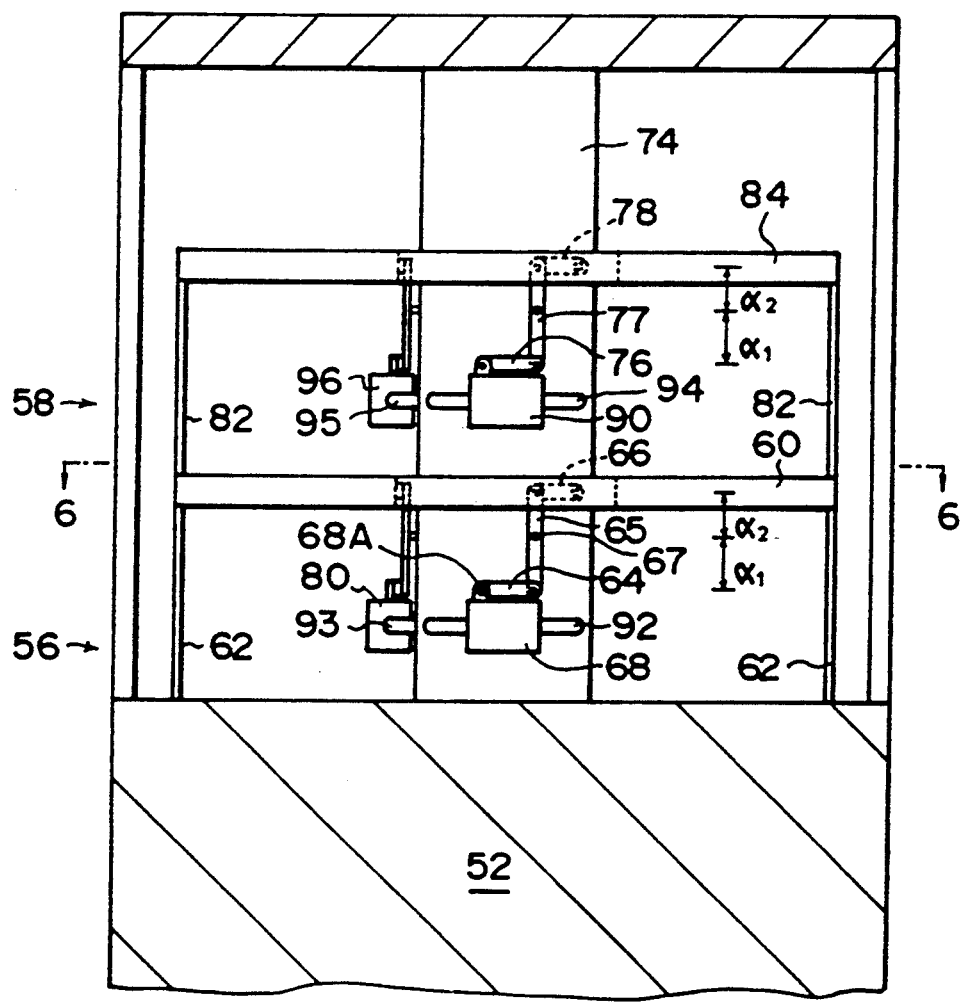
FIG. 5 is a side elevational view illustrating a vibration suppressing mechanism in accordance with the first embodiment.

First, a description will be given of a first embodiment of the present invention. As shown in FIG. 4, in a vibration suppressing structure, a main structure 52 is formed as a multi-storied (e.g., 40-storied or thereabouts) building, and a vibration suppressing mechanism 54 is built in an uppermost story of this main structure 52. As shown in FIG. 5, the vibration suppressing mechanism 54 comprises a vibration suppressing section 56 and a vibration suppressing section 58 which are superposed on top of the other. The vibration suppressing section 56 has a floor 60. The floor 60 is supported by pillars 62 having soft horizontal spring and erected on top of the main structure 52. Accordingly, the floor 60 vibrates in the horizontal direction in response to the vibration in the horizontal direction (in the directions of x- and y-axes in FIG. 6) of the main structure 52 occurring under a disturbance.

Figure 6:
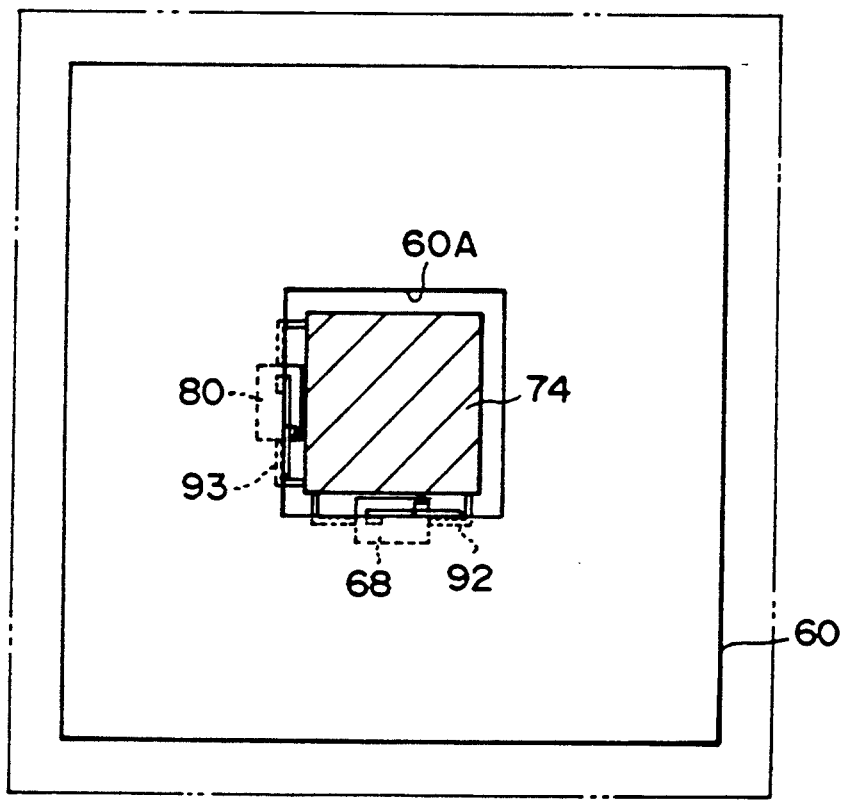
FIG. 6 is a cross-sectional view taken along line 6—6 in FIG. 5.

As shown in FIG. 6, a rectangular hole 60A is provided in a central portion of the floor 60, and rigid core walls 74 formed integrally with the main structure 52 and including an elevator and the like extend through the hole 60A. A predetermined interval is provided between each of the rigid core walls 74 and an inner peripheral surface of the hole 60A. A guide rail 92 extending along the direction of the x-axis in correspondence with the vibration suppressing section 56 is disposed on a side surface of the rigid core wall 74 parallel with the x-axis. An auxiliary mass 68 is supported by the guide rail 92 slidably along the guide rail 92. A bracket 68A is disposed on top of the auxiliary mass 68, and one end of a link 64 extending along the x-axis is rotatably coupled to the bracket 68A. One end of a link 65 is rotatably coupled to the other end of the link 64. An intermediate portion of the link 65 is pivotally supported on the rigid core wall 74 via a pin 67. In addition, one end of a link 66 extending along the x-axis is rotatably coupled to the other end of the link 65. The other end of the link 66 is coupled to the floor 60. Accordingly, when the floor 60 is displaced along the direction of the x-axis, the link 65 is swung about the pin 67, thereby causing the auxiliary mass 68 to move in a direction opposite to the direction of movement of the floor 60 along the direction of the x-axis.

In addition, a distance $a_1$ from a coupling portion between the link 64 and the link 65 to the pin 67 is set to be greater than the distance $a_2$ from a coupling portion between the link 65 and the link 66. For that reason, the link 65 acts as a lever having a lever ratio of $a_1/a_2$, so that when the floor 60 is moved distance $d_1$ along the direction of the x-axis, the link 65 moves the auxiliary mass 68 a distance $(a_1/a_2)d_1$ which is directly proportional to the aforementioned distance $d_1$.

Another guide rail 93 is disposed on a side surface of the rigid core wall 74 parallel with the y-axis in correspondence with the vibration suppressing section 56, and an auxiliary mass 80 is supported by the guide rail 93 slidably along the direction of the y-axis. The auxiliary mass 80 is coupled to the floor 60 via a plurality of unillustrated links arranged in the same way as described above. Accordingly, when the floor 60 is moved along the direction of the y-axis, the auxiliary mass 80 is moved along the direction of the y-axis in a direction opposite to the direction of movement of the floor 60 a distance in which the distance of movement of the floor 60 is multiplied by an unillustrated lever ratio of the link.

Pillars 82 having soft horizontal spring are erected, and support a floor 84 of the vibration suppressing section 58. The vibration suppressing section 58 is arranged in the same way as the vibration suppressing section 56. Although a detailed description thereof will be omitted, a guide rail 94 extending along the direction of the x-axis in correspondence with the vibration suppressing section 58 is disposed on a side surface of the rigid core wall 74 parallel with the x-axis, and an auxiliary mass 90 is supported by the guide rail 94 slidably along the guide rail 94. The auxiliary mass 90 is coupled to the floor 84 via a link 76, a link 77, and a link 78. Accordingly, the auxiliary mass 90 is moved in the same way as described above as the floor 84 moves along the direction of the x-axis. In addition, a guide rail 95 extending along the direction of the y-axis in correspondence with the vibration suppressing section 58 is disposed on a side surface of the rigid core wall 74 parallel with the y-axis, and an auxiliary mass 96 is slidably supported by the guide rail 95. The auxiliary mass 96 is moved as the floor 84 moves in the direction of the y-axis. It should be noted that the spaces above the floor 60 and the floor 84 are used as spaces for living quarters.

In this first embodiment, respective damping coefficients of the vibration suppressing sections 56, 58, the magnitudes of the auxiliary masses, and the lever ratios of the links are set in a mass matrix $M_T$ for the vibration suppressing mechanism 54, a damping matrix $C_T$, a stiffness matrix $K_T$, a location vector $i_T$ of a disturbance, in such a manner that Formulae (1) and (2) hold, with respect to a natural frequency $\omega_T^j$ of a j-th mode and a predetermined damping factor $h_T$. As a result, vibration modes other than the j-th vibration mode of the vibration suppressing mechanism 54 are suppressed, so that the vibration suppressing mechanism 54 can be handled as a system of single degree of freedom which vibrates only in the j-th vibration mode $i_T$. Accordingly, it becomes possible to handle the vibration suppressing mechanism 54 in the same way as an ordinary TMD, and it is possible to attain the suppression of the vibration of the main structure 52. However, since the vibration suppressing mechanism 54 utilizes the floors 60, 84, which are used as living quarters, as auxiliary structures, the vibration suppressing mechanism 54 acts as a TMD whose mass ratio is very large, so that a very large vibration suppressing effect can be obtained.

In addition, as stated in the Summary of the Invention, since it is also possible to suppress the vibration of the floors 60, 84 utilized as auxiliary structures, the comformability of the spaces formed above the floors 60 and 84 can be improved, thereby making it possible to make effective use of the spaces within the structure.

In should be noted that although in the first embodiment the driving means are constituted by the levers of the links 65, 77, the driving means in accordance with the present invention are not limited to the same.

In addition, although in the first embodiment the plurality of vibration suppressing sections 56, 58 are built on top of another to constitute the vibration suppressing mechanism 54, the vibration suppressing mechanism may be constituted by a single vibration suppressing section. As the single vibration suppressing mechanism, it suffices if the following arrangement is adopted. In, for example, FIG. 5, the floor 84 is supported by pillars erected on top of the main structure 52 and having soft horizontal spring to constitute an auxiliary structure, the floor 60 is suspended from the floor 84 by pillars suspended downwardly of the floor 84, the floors 60, 84 and the rigid core walls 74 are coupled to each other by means of links to allow the floor 60 to act as an auxiliary mass, and the damping coefficients of the dampers, the mass of the floor 60, and the lever ratios of the links are set in such a manner as to satisfy the aforementioned Formulae (19) and (20). Since the floor 60 is used as the auxiliary mass, the mass ratio can be made large, so that the lever ratios of the links can be made small. Since the response value of the floor 60 becomes small due to the fact that the lever ratios of the links are made small, the space above the floor 60 can be used as living quarters.

Second Embodiment

Next, a description will be given of a second embodiment of the present invention. It should be noted that portions identical to those of the first embodiment will be denoted by the same reference numerals, and a description thereof will be omitted.

Figure 7:
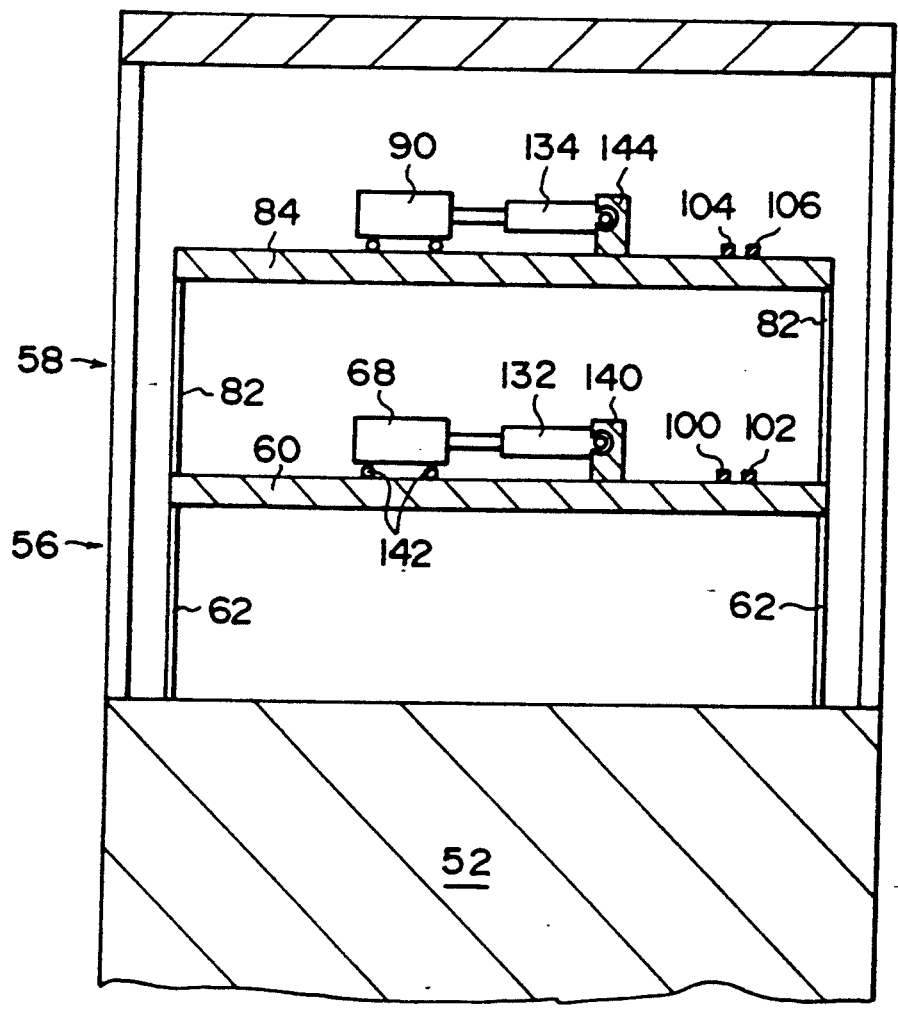
FIG. 7 is a side elevational view illustrating a vibration suppressing mechanism in accordance with a second embodiment.
Figure 8:
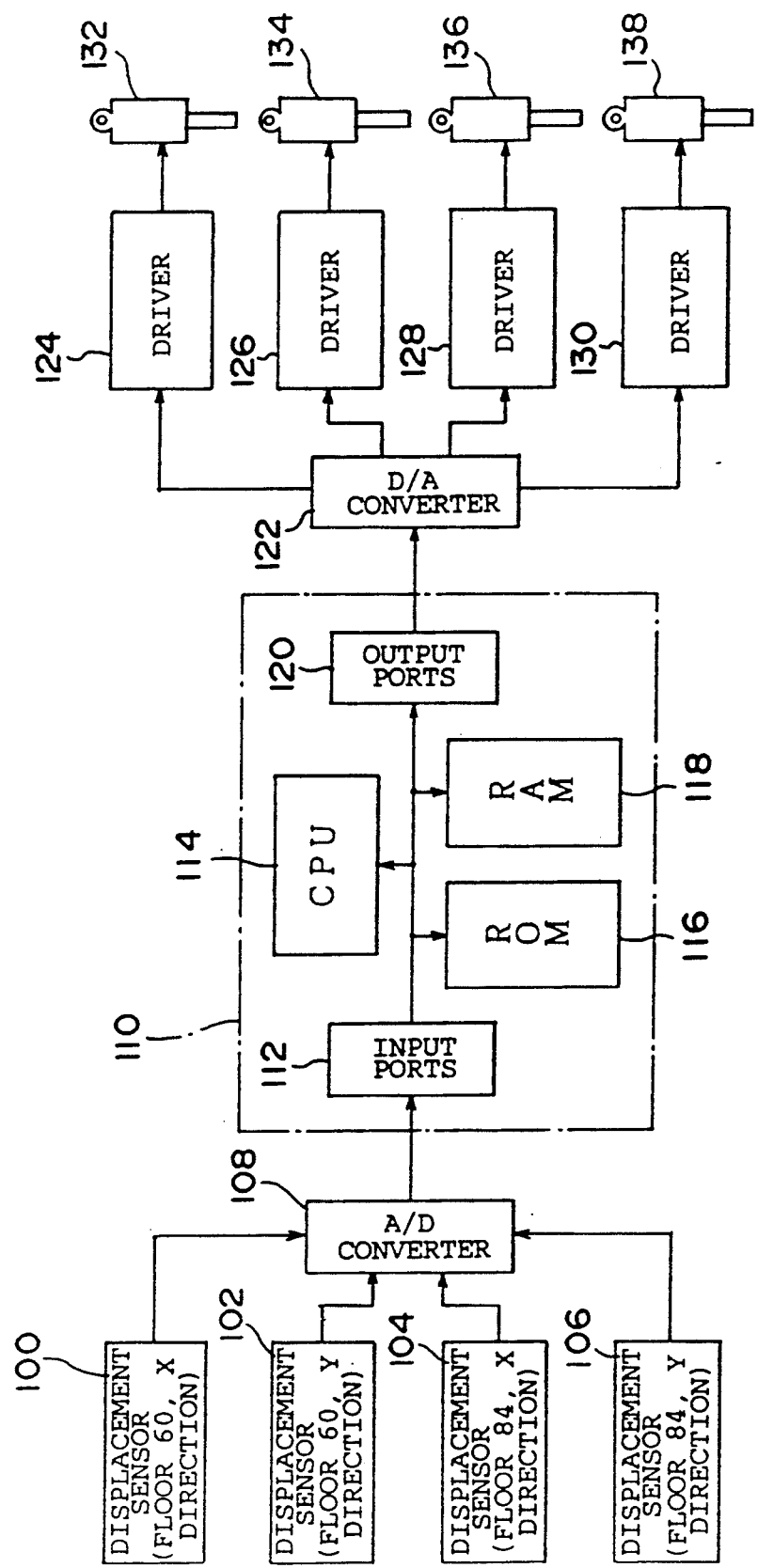
FIG. 8 is a block diagram illustrating of a schematic configuration of a control circuit and its peripheral circuits in accordance with the second embodiment.

As shown in FIG. 7, a sensor 100 for detecting the motion of the floor 60 in the direction of the x-axis and a sensor 102 for detecting the motion of the floor 60 in the direction of the y-axis are mounted on the floor 60 of the vibration suppressing section 56. Similarly mounted on the floor 84 of the vibration suppressing section 58 are a displacement sensor 104 for detecting the motion of the floor 84 in the direction of the x-axis and a displacement sensor 106 for detecting the motion thereof in the direction of the y-axis. As shown in FIG. 8, the sensors 100, 102, 104, 106 are connected to input ports 112 of a control circuit 110 via an A/D converter 108.

The control circuit 110 comprises the input ports 112, a CPU 114, a ROM 116, a RAM 118, and output ports 120, all of which are connected to each other. Drivers 124, 126, 128, 130 are connected to the output ports 120 via a D/A converter 122. An actuator 132 is connected to the driver 124. As shown in FIG. 7, the actuator 132 is disposed on the floor 60 along the direction of the x-axis, and one end thereof is coupled to a bracket 140 formed integrally with the floor 60, the other end thereof being coupled to the auxiliary mass 68. Rollers 142 are interposed between the auxiliary mass 68 and the floor 60. In response to an instruction from the control circuit 110, the driver 124 controls the motion of the actuator 132. As a result the auxiliary mass 68 is controlled along the direction of the x-axis.

An actuator 134 connected to the driver 126 is disposed on the floor 84 along the direction of the x-axis, and one end thereof is coupled to a bracket 144 formed integrally with the floor 84, the other end thereof being coupled to the auxiliary mass 90. The overall length of the actuator 134 is extended or shortened by the driver 126, and the auxiliary mass 90 is correspondingly moved along the direction of the x-axis. In addition, actuators 136, 138 are connected to the drivers 128, 130, respectively. The actuator 36 (not shown in FIG. 7) is disposed on the floor 60 along the direction of the y-axis, and causes the auxiliary mass 80 to move along the direction of the y-axis. Similarly, the actuator 138 is disposed on the floor 84 along the direction of the y-axis, and causes the auxiliary mass 96 to move along the direction of the y-axis.

Here, as a precondition in the second embodiment, the control circuit 110 provides control in such a manner as to move a corresponding one of the auxiliary masses by an amount of movement directly proportional to a displacement amount detected by the sensor. For instance, in a case where it is detected by the sensor 100 that the floor 60 has undergone displacement by a displacement amount d along the direction of the x-axis, the auxiliary mass 68 is moved in a direction opposite to that direction of movement along the x-axis a distance $\alpha d$ in which the displacement amount d is multiplied by a predetermined proportional constant $\alpha$. By virtue of this precondition, the magnitudes of the elements in the respective matrices in the equation of vibration in Formula (3) can be adjusted by the proportional constant $\alpha$ and the size or the auxiliary mass.

In addition, with respect to the predetermined damping factor $h_T$, the control circuit 110 sets the aforementioned proportional constant $\alpha$ in the mass matrix $M_T$ for the vibration suppressing section, the damping matrix $C_T$, the stiffness matrix $K_T$, the location vector $i_T$ of a disturbance, and the natural frequency $\omega_T^j$ of the j-th mode in such a manner that Formulae (1) and (2) hold. As a result, vibration modes other than the j-th vibration mode of the vibration suppressing mechanism 54 are suppressed in the same way as in the first embodiment. Hence, the vibration suppressing mechanism 54 can be handled as a system of a single degree of freedom which vibrates only in the j-th vibration mode $i_T$. At the same time, since the floors 60 and 84 are used as auxiliary structures (masses), a very large mass ratio can be obtained, so that the vibration of the main structure 52, which is a multi-storied building, can be suppressed by providing an appropriate damping constant $h_T$.

In addition, since the vibration of the floors 60 and 84 used as the auxiliary structures can also be controlled in the same way as in the first embodiment, the comfortability of the spaces formed above the floors 60 and 84 can be improved, so that the spaces within the structure can be effectively utilized. In addition, in the second embodiment, since there is no need to support the levers by means of the rigid core walls 74 and the like, the flexibility in the design of the vibration suppressing mechanism 54 improves.

Next, a description will be given of the vibration suppressing effect of the vibration suppressing mechanism (TMMD) in accordance with the present invention by introducing specific numerical values with respect to the vibration suppressing structure 50 of the first embodiment, and by showing dynamic characteristics and response time-histories with respect to an input of an earthquake. It should be noted that although the vibration suppressing effect in the direction of the x-axis will be described hereafter, the same effect can be obtained with respect to the direction of the y-axis.

Figure 1:
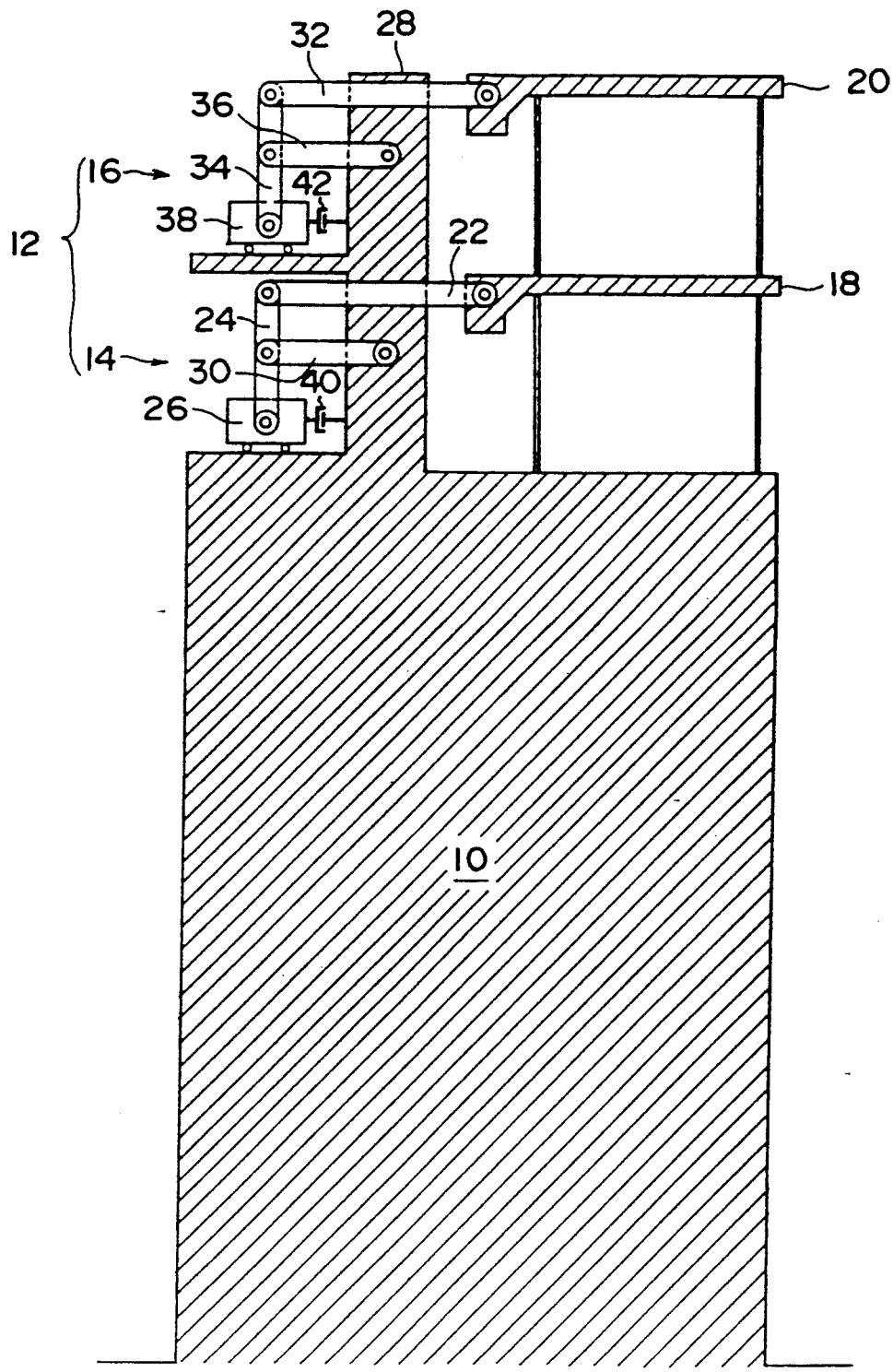
Figure 2:
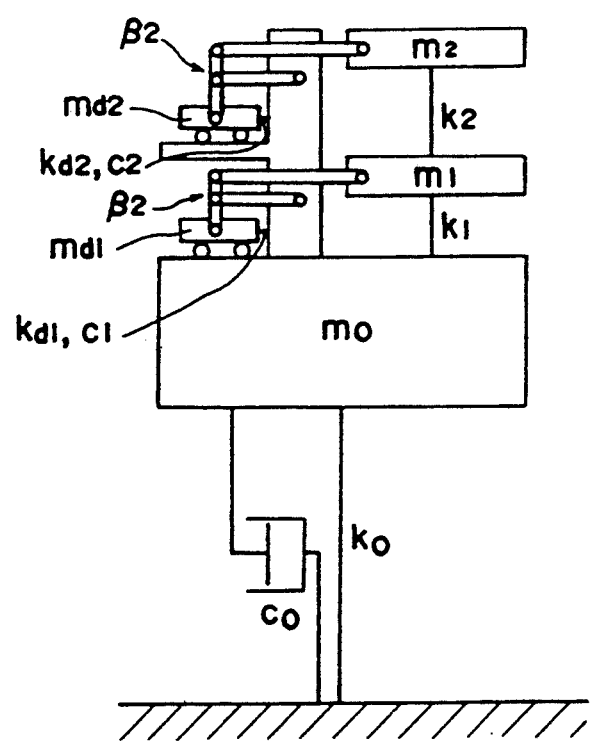
FIG. 2 is a conceptual diagram illustrating a model explaining the operation of the vibration suppressing structure in accordance with the present invention.
Figure 3:
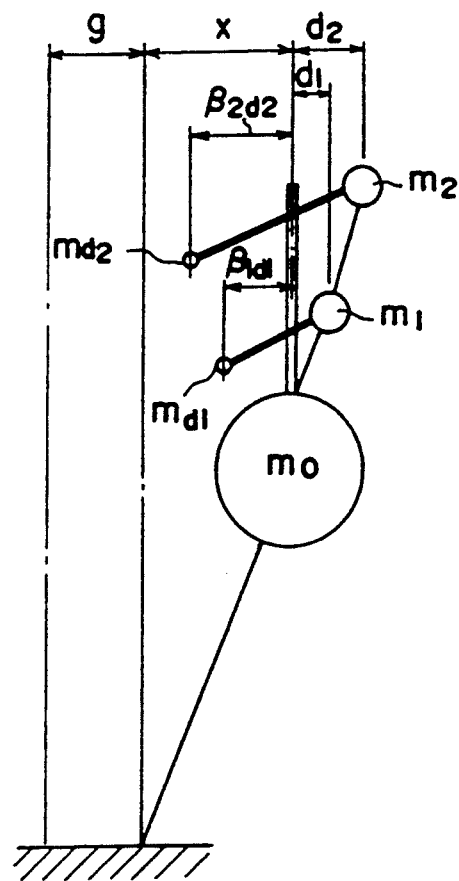
FIG. 3 is a conceptual diagram for defining the coordinates of the mathematical model shown in FIG. 2.

By assuming that the main structure 52 of the vibration suppressing structure 50 shown in FIGS. 4 and 5 can be modeled as a concentrated mass system as shown in FIG. 2, and its coordinates are defined as shown in FIG. 3, under the condition that the erected wall 74 in FIG. 5 is rigid. As parameters, it is assumed that the mass $m_0$ of the main structure $52=1$; the mass $m_1$ of the floor $60=0.05$; the mass $m_2$ of the floor $84=0.05$; the magnitude $m_{d1}$ of the auxiliary mass $68=0.001$; the magnitude $m_{d2}$ of the auxiliary mass $90=0.001$; the relationship between a spring constant $k_2$ between $m_2$ and $m_1$ and a spring constant $k_1$ between $m_1$ and $m_0$ is set as $k_2 = k_1$; and a spring constant $k_{d1}$ between the auxiliary mass 68 and the rigid wall 74 and a spring constant $k_{d2}$ between the auxiliary mass 90 and the rigid wall 74 are both set to zeros. Accordingly, if it is assumed that the main structure 52 is 40-storied, the mass $(m_1+m_2)$ of the vibration suppressing mechanism 54 corresponds to a mass of a four-layer portion of the main structure, and the auxiliary mass $(m_{d1}+m_{d2})$ of the vibration suppressing mechanism 54 corresponds to 0.2% of the main structure.

A lever ratio $\beta_2$ with respect to the auxiliary mass 90 ($m_{d2}$) is set as $\beta_2=5.0$, and if $\beta_1$ is determined for the vibration suppressing mechanism 54 in such a manner that Formula (1) holds, the following three solutions are obtained:

$$\beta_1 = 1.054, \beta_1 = 6.51, \beta_1 = 8.25$$

If $\beta_1 = 8.25$ is adopted, the location vector $i_T$ of a disturbance is $$i_T^T = [0.7333, 0.4936]$$

so that it is evident that the vibration modes of the vibration suppressing structure 50 other than the vibration mode of the first order are suppressed.

In addition, since $k_2=5.0$, and $\beta_1=8.25$, the mass matrix $M_T$ for the vibration suppression section is expressed as follows:

$$M_T = \begin{bmatrix} 0.05 + 0.001 \times (5)^2 & \\ & 0.05 + 0.001 \times (8.25)^2 \end{bmatrix} = \begin{bmatrix} 0.075 & \\ & 0.1181 \end{bmatrix}$$

As a result, the effective mass $i_T^T M_T i_T$ of the TMDD becomes as follows:

$$i_T^T M_T i_T = 0.069$$

Although the auxiliary mass serving purely as a weight accounts for only 0.2% of the main structure, as described above, the virtual auxiliary mass is expanded by approximately 35-fold through the effective utilization of the lever mechanism and the living quarters in uppermost stories. Since the mass $m_0$ of the main structure is 1, $i_T^T M_T i_T$ itself corresponds to an auxiliary mass ratio $\mu$ referred to in the TMD theory.

Accordingly, if the tuned frequency $\omega_T^1$ of the vibration suppressing mechanism 54 is determined with respect to the natural frequency $\omega_0$ ($\omega_0^2 = k_0/m_x$) of the main structure 52 by making use of the theory of the TMD, we have $$\omega_T^1 = 0.951 \omega_0$$

Figure 9:
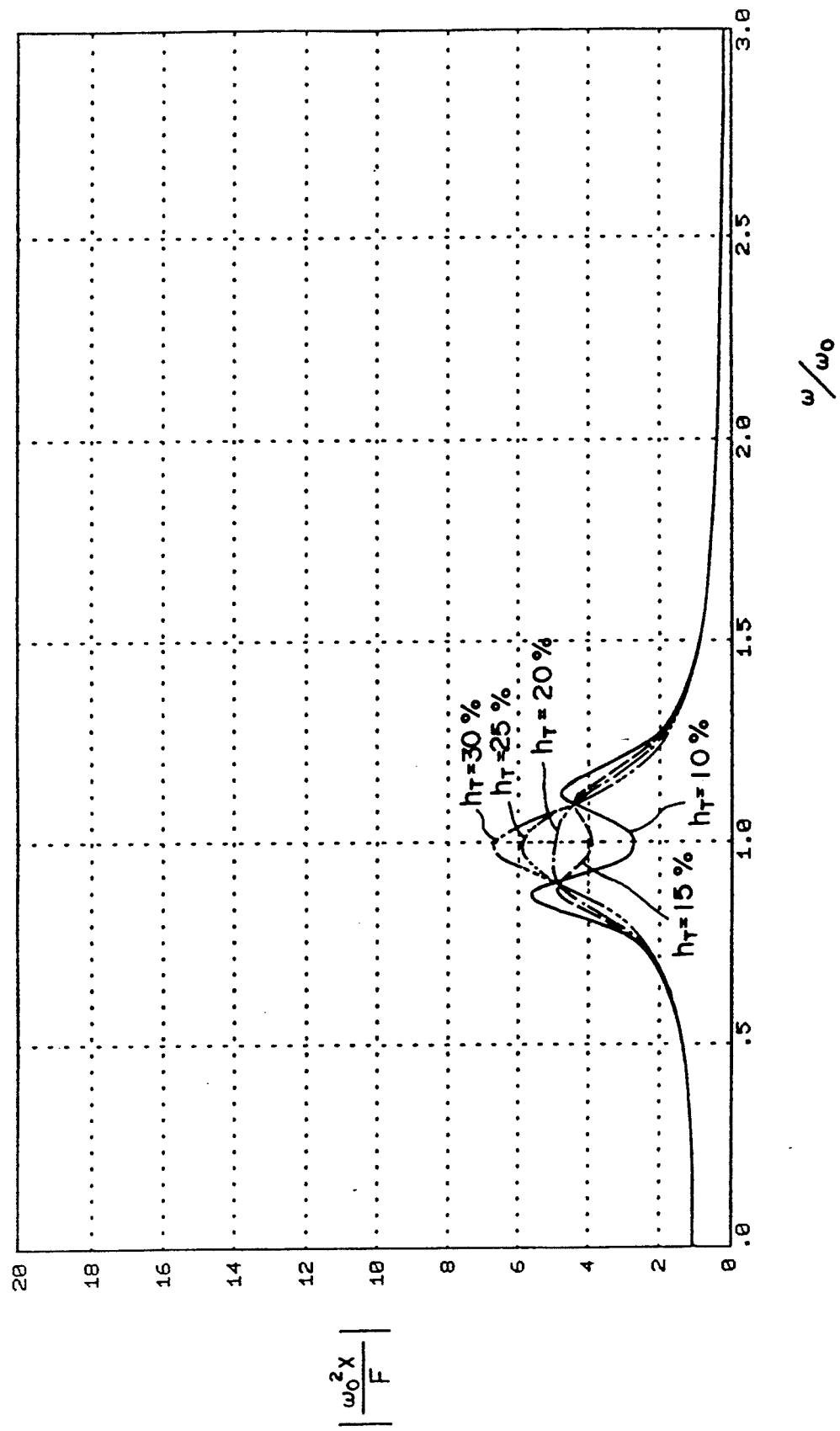
FIG. 9 is a diagram illustrating changes in an amplification factor $|\omega_0^2 x/F|$ of the vibration suppressing structure using a damping factor $h_T$ as a parameter when the frequency of an input g is varied.

It suffices if $k_2$ and $k_1$ for the vibration suppressing section are determined in such a manner as to satisfy the value of $\omega_T^1$. FIG. 9 shows the relationship of an amplification factor $|\omega_0^2 x/F|$ of the main structure 52 of the vibration suppressing structure 50 using a viscous damping factor $h_T$ as a parameter when the input g to the vibration suppressing structure 50 is set as $g = F\sin\omega t$ in which the symbol $\omega$ means the frequency of a simple harmonic loading. It should be noted that the viscous damping factor $h_0$ of the main structure 52 is set as 0.02 (where $c_0/m_x = 2h_0\omega_0$). The amplification factor $|\omega_0^2 x/F|$ is approximately 5 for the parameter of $h_T=0.20$ (20%) at the time of resonance ($\omega/\omega_0=1$) when the frequency of the input g coincides with the natural frequency of the main structure. Accordingly, from the amplification factor ($\frac{1}{2}$h) at the time of resonance of simple harmonic motion, it can be appreciated that the viscous damping factor of the main structure 52 is increased from 2% to 10%, i.e., a five-fold damping characteristic is imparted, as a result of the provision of the vibration suppressing mechanism 54.

Figure 10:
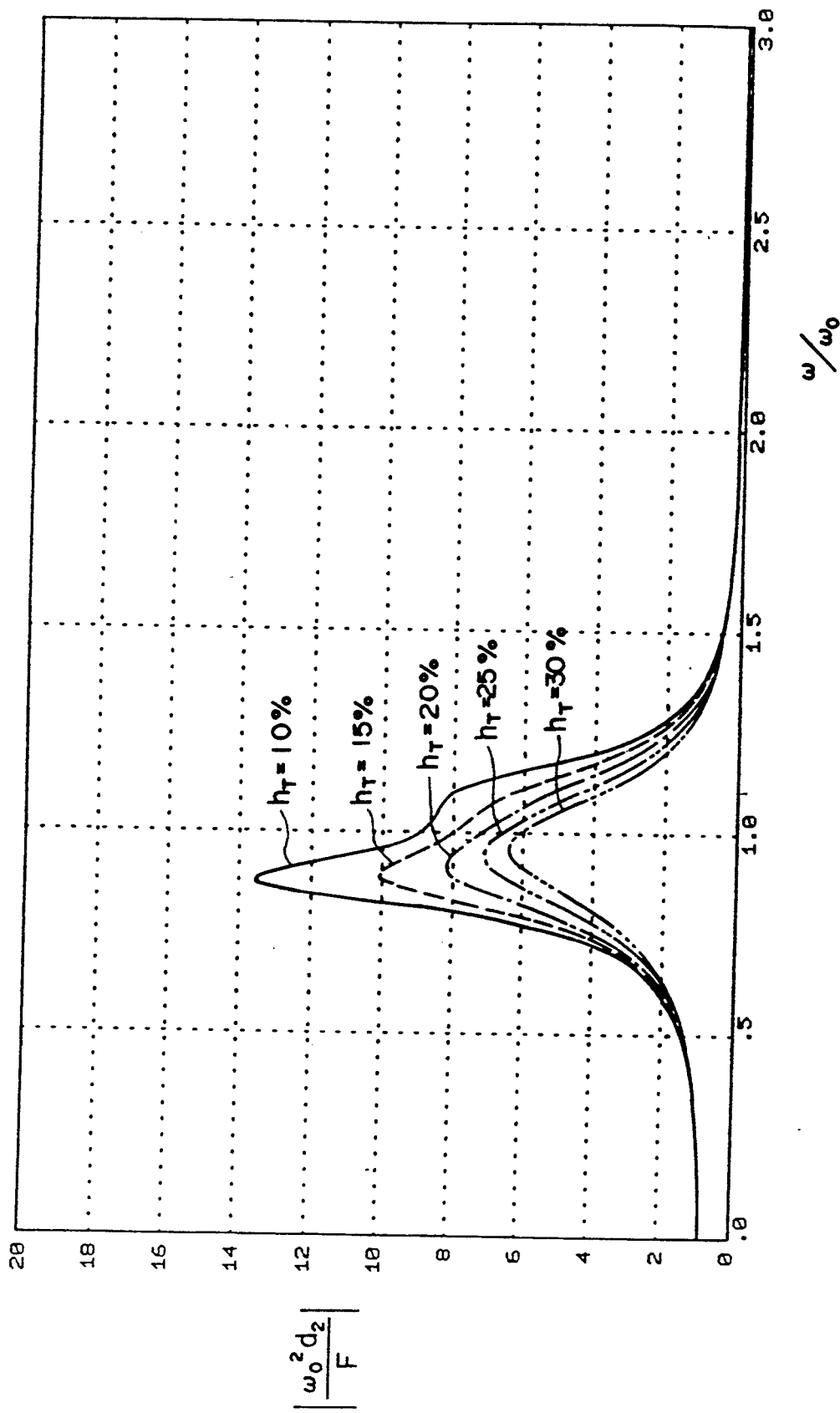
FIG. 10 is a diagram illustrating changes in an amplification factor $|\omega_0^2 d_2/F|$ of the vibration suppressing structure using a damping factor $h_T$ as a parameter when the frequency of an input g is varied.

FIG. 10 shows the relationship of an amplification factor $|\omega_0^2 d_2/F|$ of an uppermost-layer mass $m_2$ in the vibration suppressing mechanism 54 of the vibration suppressing structure 50 using the viscous damping factor $h_T$ as a parameter when the frequency of a simple harmonic input g is varied in the same way as described above. Although in the case of a conventional TMD the value of the optimum damping factor $h_T$ is given, in the case of the TMMD vibration suppressing structure in accordance with the present invention, the value of the optimum damping factor $h_T$ should be determined through a tradeoff between the TMMD section and the main structure, and it can be seen that the vibrations of both the TMMD section and the main structure are suppressed at $h_T=0.20-0.25$ or thereabouts.

It should be noted that a tuned mass damper generally experiences a phase lag of about $\pi/2$ with respect to the main structure, which gives the substantial damping effect to the structure. Accordingly, the motion of the TMMD constituting the vibration suppressing mechanism 54 is naturally governed by that characteristic.

To illustrate this fact, FIGS. 11A to 11E and FIGS. 12A to 12E show response waveforms of inter-story displacement (FIGS. 11A to 11E) and absolute displacement (FIGS. 12A to 12E) when N-S components (maximum acceleration=225 Gal) obtained at Hachinohe in the Tokachi-offing earthquake in 1968 are set as the earthquake input g. It should be noted that FIGS. 11A and 12A show the response waveforms at $d_2$; FIGS. 11B and 12B, at $\beta_2 d_2$; FIGS. 11C and 12C, at $\beta_1 d_1$; FIGS. 11D and 12D, at $d_1$; and FIGS. 11E and 12E, at x; and the natural period of the main structure is set at 5 sec.

In FIGS. 11A to 11D, although the maximum response values of the waveforms are different, the waveforms are utterly similar, which shows that the vibration suppressing section behaves as a single vibrating system. Another characteristic lies in that the phase of the waveforms of the vibration suppressing section in FIGS. 11A to 11D and that of the waveform in FIG. 11E of the main structure differ from each other by about $\pi/2$, as shown by the solid lines. When the main structure is at a maximum value, the response value of the vibration suppressing section is approximately zero, while, to the contrary, when the response value of the vibration suppressing section is maximum, that of the main structure is zero. Thus, it can be appreciated that when the vibration suppressing section is vibrated with a phase difference of about $\pi/2$ with respect to the main structure the vibration can be suppressed.

Accordingly, in FIGS. 11A to 11E the displacement between $m_2$ in the vibration suppressing section and $m_0$ in the main structure is 16.2 cm, whereas in FIGS. 12A to 12E the displacement between the ground and $m_2$ in the vibration suppressing section is 21.3 cm, while the displacement between the ground and $m_0$ in the main structure is 16.7 cm. Thus, there is little difference between the maximum response value of the living quarters in the vibration suppressing section and that of the main structure. However, the auxiliary mass at the distal end of the lever must be moved by 81–91 cm by that portion.

It should be noted that although in the above a description has been given of an example in which the vibration suppressing mechanism comprises a plurality of vibration suppressing sections built one on top of another on the main structure, in a case where a higher vibration mode of the main structure is largely excited the vibration suppressing mechanism may be provided in the intermediate story in which an element of that mode vector becomes large (e.g. a maximal value occurs). As a result, the vibration of the main structure can be effectively suppressed. In the case where the vibration suppressing mechanism is disposed in the intermediate story, the vibration suppressing mechanism can be handled as the TMD having a large mass ratio in the same way as described in the preceding embodiment.

As described above, in accordance with a first aspect of the present invention, the vibration suppressing sections, each of which includes the driving means provided for controlling the auxiliary mass by an amount of movement directly proportional to an amount of displacement of the auxiliary structure caused by the vibration, in a direction in which the displacement is suppressed, are disposed in the upper portion of the main structure, each vibration suppressing section being arranged such that the damping coefficient of each vibration suppressing section, the magnitude of the auxiliary mass, and the ratio of the amount of movement of the auxiliary mass to the amount of displacement of the auxiliary structure which are included in the mass matrix $M_T$, the damping matrix $C_T$, the stiffness matrix $K_T$, the location vector $i_T$ of a disturbance, are adjusted in such a manner that the relationships of $$(\omega_T^j)^2 \cdot M_T i_T = K_T i_T$$

$$2h_T \omega_T^j \cdot M_T i_T = C_T i_T$$

hold, with respect to the natural frequency $\omega_T^j$ of a j-th mode and the predetermined damping factor $h_T$. As a result, it is possible to obtain outstanding advantages in that even in the case of a multi-storied structure the vibration can be effectively suppressed, and that the space within the structure can be effectively utilized.

In the second aspect of the invention, the amount of displacement of the auxiliary structure caused by the vibration is detected, and the auxiliary mass is controlled by an amount of movement in which the amount of displacement of the auxiliary structure detected by the detecting means is multiplied by a predetermined proportional constant. At the same time, the proportional constant of the vibration suppressing section is set in the mass matrix $M_T$ for the vibration suppressing section, the damping matrix $C_T$, the stiffness matrix $K_T$, the location vector $i_T$ of a disturbance, and the natural frequency $\omega_T^j$ of the j-th mode in such a manner that the relationships of $$(\omega_T^j)^2 \cdot M_T i_T = K_T i_T$$

$$2h_T \omega_T^j \cdot M_T i_T = C_T i_T$$

hold, with respect to the predetermined damping factor $h_T$. Consequently, it is possible to obtain outstanding advantages in that even in the case of a multi-storied structure the vibration can be effectively suppressed, and that the space within the structure can be effectively utilized.

What is claimed is:

1. A vibration suppressing structure comprising:
a main structure; and
a vibration suppressing section disposed in an upper portion of said main structure, wherein said vibration suppressing section is comprised of; an auxiliary structure adapted to undergo vibration in response to the vibration of said main structure occurring due to a disturbance, an auxiliary mass, driving means for controlling said auxiliary mass by an amount of movement directly proportional to an amount of displacement of said auxiliary structure caused by the vibration, in a direction in which the displacement is suppressed, and a damper,
said vibration suppressing section being arranged such that a damping coefficient of said damper, a magnitude of said auxiliary mass, and a ratio of the amount of movement of said auxiliary mass to an amount of displacement of said auxiliary structure which are included in a mass matrix $M_T$ for said vibration suppressing section, a damping matrix $C_T$, a stiffness matrix $K_T$, a location vector $i_T$ of a disturbance, are adjusted in such a manner that the relationships of $$(\omega_T^j)^2 \cdot M_T i_T = K_T i_T$$

$$2 h_T \omega_T^j \cdot M_T i_T = C_T i_T$$

hold, with respect to a natural frequency $\omega_T^j$ of a j-th mode and a predetermined damping constant $h_T$, thereby constituting a system of pseudo- single degree of freedom.

2. A vibration suppressing structure according to claim 1, wherein a plurality of said vibration suppressing sections are superposed one on top of another in the upper portion of said main structure.

3. A vibration suppressing structure comprising:
a main structure; and
a plurality of vibration suppressing sections disposed respectively in an upper portion of said main structure and in an intermediate story of said main structure where an element of an eigen vector in a specific higher mode becomes large, wherein each of said vibration suppressing sections is comprised of:
an auxiliary structure adapted to undergo vibration in response to the vibration of said main structure occurring due to a disturbance, an auxiliary mass, driving means for controlling said auxiliary mass by an amount of movement directly proportional to an amount of displacement of said auxiliary structure caused by the vibration, in a direction in which the displacement is suppressed, and a damper, each of said vibration suppressing sections being arranged such that a damping coefficient of said damper, a magnitude of said auxiliary mass, and a ratio of the amount of movement of said auxiliary mass to an amount of displacement of said auxiliary structure which are included in a mass matrix $M_T$ for said vibration suppressing section, a damping matrix $C_T$, a stiffness matrix $K_T$, a location vector $i_T$ of a disturbance, are adjusted in such a manner that the relationships of $$(\omega_T^j)^2 \cdot M_T i_T = K_T i_T$$

$$2 h_T \omega_T^j \cdot M_T i_T = C_T i_T$$

hold, with respect to a natural frequency $\omega_T^j$ of a j-th mode and a predetermined damping factor $h_T$, thereby constituting a system of a pseudo- single degree of freedom.

4. A vibration suppressing structure according to claim 3, wherein the plurality of said vibration suppressing sections are superposed one on top of another in the upper portion of said main structure.

* * * * *

UNITED STATES PATENT AND TRADEMARK OFFICE
CERTIFICATE OF CORRECTION

PATENT NO. : 5,265,387
DATED : November 30, 1993
INVENTOR(S) : Shinji Ishimaru et al It is certified that error appears in the above-indentified patent and that said Letters Patent is hereby corrected as shown below:

On the title page: Item

[73] Assignees: change "Takenaka Corporation, Osaka; Tokyo Construction Co., Ltd., Tokyo, both of Japan" to --Takenaka Corporation, Osaka; Tokyu Construction Co., Ltd., Tokyo, both of Japan--.

Signed and Sealed this

Eighteenth Day of October, 1994

Attest:

BRUCE LEHMAN

Attesting Officer

Commissioner of Patents and Trademarks